J. M. SEAVER.
SEPARATOR.
APPLICATION FILED AUG. 18, 1908.

940,076.

Patented Nov. 16, 1909.

2 SHEETS—SHEET 1.

Witnesses:
Josephine H. Ryan
Ruby M. Banfield

Inventor:
Jonathan M. Seaver,
by Roberts, Roberts & Cushman,
Attys.

J. M. SEAVER.
SEPARATOR.
APPLICATION FILED AUG. 18, 1908.

940,076. Patented Nov. 16, 1909.
2 SHEETS—SHEET 2.

Witnesses:

Inventor:
Jonathan M. Seaver;
by Roberts, Roberts & Cushman,
Attys.

UNITED STATES PATENT OFFICE.

JONATHAN M. SEAVER, OF BOSTON, MASSACHUSETTS.

SEPARATOR.

940,076.  Specification of Letters Patent.  Patented Nov. 16, 1909.

Application filed August 18, 1908. Serial No. 449,129.

*To all whom it may concern:*

Be it known that I, JONATHAN M. SEAVER, a citizen of the United States, and resident of Boston, in the county of Suffolk and State of Massachusetts, have invented new and useful Improvements in Separators, of which the following is a specification.

This invention relates to separators for comminuted and finely divided materials, such for example as ivory black, and its object is to provide an apparatus of increased efficiency and increased capacity over that heretofore used for the same purpose.

The apparatus is designed for the treatment of materials of which the finished product is in impalpable dust or powder.

As is well known it is impossible by a grinding process alone to reduce the whole mass of the material to a sufficiently fine condition, or to secure uniformity in the size and weight of the particles of the pulverized or comminuted mass. It is also well known that even the coarsest particles of the ground mass are so fine that it is impracticable to separate the fine particles therefrom by screening. Accordingly it is the practice to employ some form of pneumatic separator, and the present invention consists in certain improvements in pneumatic separators resulting in increasing the efficiency and economy of such separators.

Figure 1:
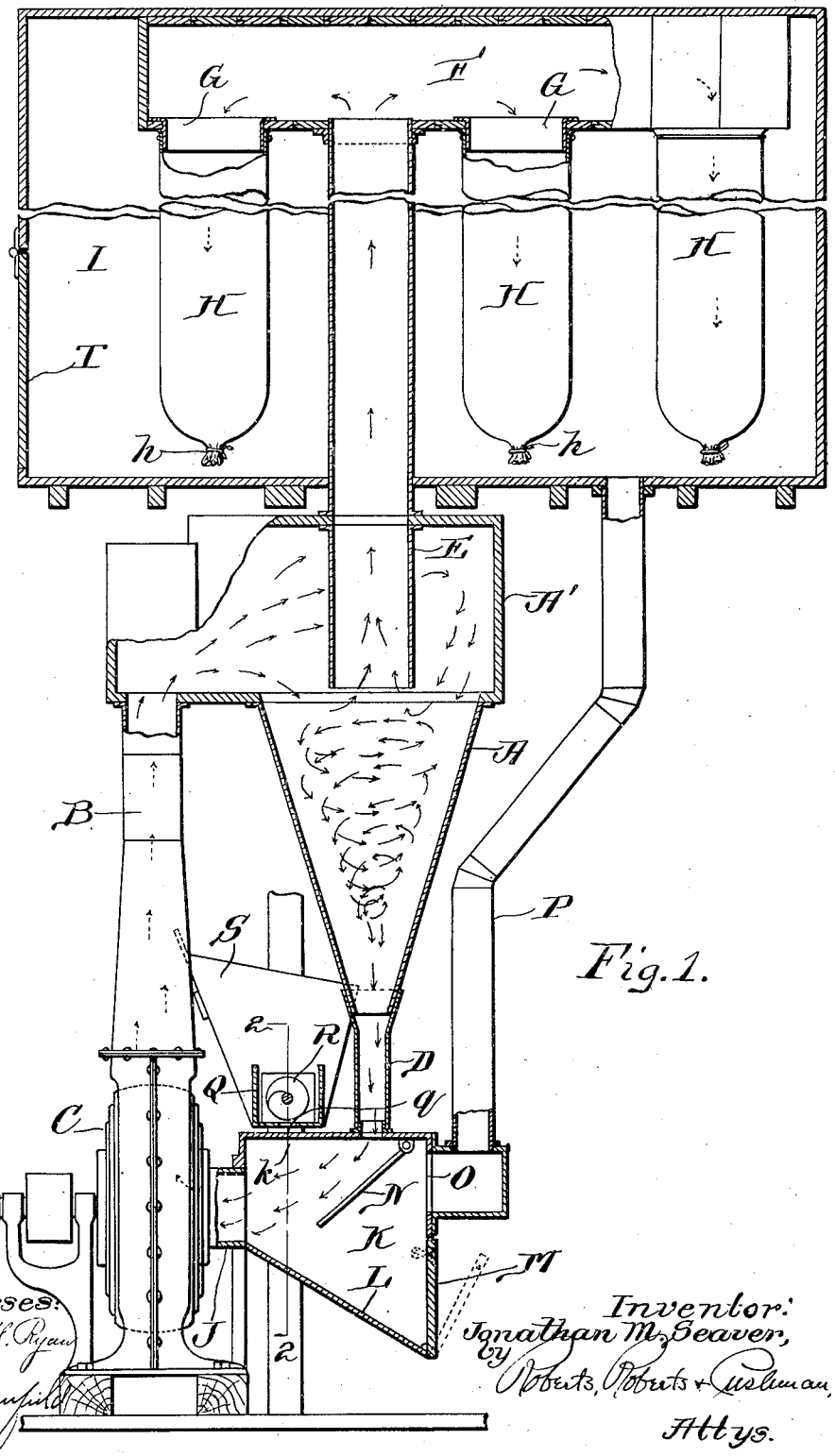
Figure 2:
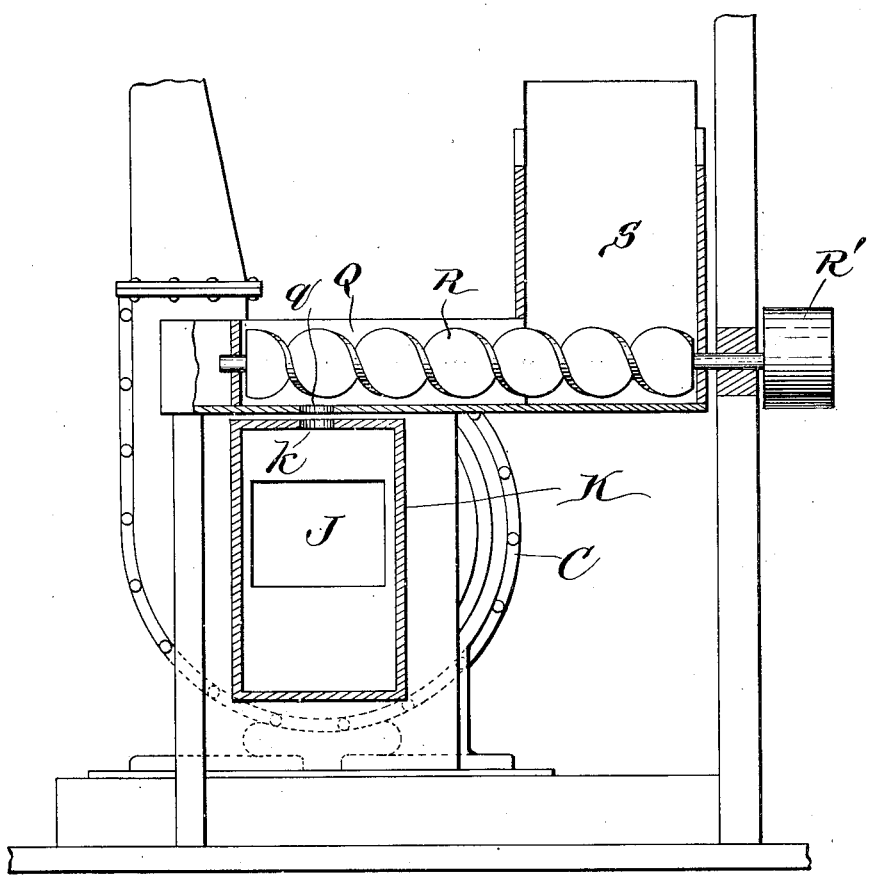

In the accompanying drawings which illustrate one embodiment of my invention,—Figure 1 is a vertical section, partly in elevation, of a pneumatic separating apparatus containing one form of my invention; and Fig. 2 is an enlarged vertical section through the gravity separator chamber on line 2—2 of Fig. 1.

The separator chamber A which, as herein shown is of the cyclone or centrifugal type, consists of an inverted cone having at its top a casing A' into which opens the air inlet pipe B. A fan blower C delivers a blast of air into the chamber A through pipe B. At the bottom of the chamber A is a discharge pipe D smaller in cross sectional area than the inlet pipe B. Communicating with the interior of chamber A, and preferably in the central axis thereof is a dust pipe E, which leads upward through the top of casing A' to any approved form of dust or powder collector. The form of dust collector which is recommended consists of the chamber F, with the bottom of which the pipe E communicates, having a number of apertures G in its bottom, beneath which hang the tubes H of porous textile material, each tube being gathered together at its bottom end and tied with a string $h$ to form a bag. The tubes H are inclosed in a dust chamber or room I, which is usually located on the floor above the separator chamber. The fan blower C is fitted with an intake pipe J. The apparatus thus far described is well known and in common use, and its operation is as follows: The finely divided material to be treated is delivered by hand into the intake pipe of the fan, whence it is carried by the air current through pipe B into the "cyclone" or separator chamber A. The coarser and heavier particles are thrown by centrifugal force toward the walls of chamber A and the finest and lightest particles are carried by the current through pipe E into the dust collector where they are caught in the bags H, the air passing out through the pores or meshes of the bags. The pipe E is of larger cross sectional area than the outlet pipe D, as is also the inlet pipe B, so that a sufficiently strong air current for carrying off the dust or powder tends to pass upward through pipe E. The coarser and heavier particles fall by gravity, assisted also by the air current which is divided in chamber A, through pipe D.

Although a substantial part of the finest material will be carried off through pipe E and collected in the bags H, a very considerable part of the finely divided material suitable to enter into the finished product will escape the pipe E and be carried with the coarser particles out through the discharge pipe D. Inasmuch as the material thus discharged contains a high percentage of coarse material, it is not practicable to feed it again through the apparatus as it would be likely to clog the blower, and it is the practice therefore to re-grind the whole of the material discharged from the chamber A, although it contains much fine dust suitable to enter into the finished product if it could be separated, before again passing it through the apparatus.

The object of the present invention is to extract substantially the whole of the fine material suitable to enter into the finished product, from the coarser material, before the coarser material is discharged from the apparatus for re-grinding. This is accomplished by the use of a gravity separator chamber in combination as presently to be described which receives the material discharged from the centrifugal separator chamber, and separates the coarser particles therefrom, delivering again only such material as is adapted for treatment without regrinding into the blower and thence into the centrifugal separator. I will now describe said gravity separator chamber and its associated parts. Said gravity chamber comprises the trap or box K through the top of which opens the cyclone discharge pipe D. One end of the box K is connected with the blower intake pipe J so that a continuous circulation of air is maintained through the centrifugal and gravity separator chambers and the blower, as illustrated by the arrows. The bottom of the chamber K is inclined downwardly and rearwardly as shown at L, and the rear wall of the chamber is provided with a door M. Depending from the top of the chamber K and pivoted therein is a deflector N which swings freely from its pivotal support. The chamber K is also provided in its rear side with the opening O, which is connected by pipe P with the interior of the dust chamber I. At the top of the box K is mounted a trough Q in which is a worm or screw conveyer R continuously driven through pulley R', by any suitable means. The box K is made with an opening k in its top, registering with an opening q in the bottom of the trough Q. A hopper S is mounted above the trough Q.

The operation of the device is as follows: When the blower C is started both the door T of the dust chamber I, and the door M of the secondary chamber K are closed. The ground material is fed into the hopper S whence it is carried by the continuously operated screw conveyer R to the openings q and k through which it falls into the chamber K. The material is there caught by the air current passing through the chamber K and carried through the blower C and pipe B into the centrifugal separator chamber or "cyclone" A. A portion of the finest and lightest particles is thence carried through the dust pipe E into the dust collector as already described, the rest of the material passing out of the chamber A through pipe D. Until the tubes H become partially filled, a certain amount of the dust or powder will escape through the pores of the tubes into the dust chamber I, and it is for this reason that the door T of the chamber I is closed when the apparatus is being started. The pipe P, through which a strong current of air is maintained so long as the door M into the chamber K is kept closed, carries the dust or powder escaping into the chamber I back again into the air circuit passing through the separators, thus not only clearing the chamber I of objectionable dust, but also saving the dust or powder which might otherwise be lost. As soon as the pores of the tubes H are sufficiently filled to prevent further escape of dust into chamber I, the doors T and M are opened. As already stated the material delivered from chamber A through pipe D contains a large amount of fine particles suitable to enter into the finished product. When said material enters chamber K the deflector N causes the lighter and finer particles to pass with the air current into the intake pipe J, while the coarser and heavier particles fall by gravity upon the inclined bottom L of chamber K which serves as a chute to carry away said coarser material to be re-ground and returned to the hopper S. Fresh ground material is continuously being fed into chamber K by the conveyer R, and uniting with the finer material received from chamber A, furnishes the apparatus with a continuous supply of material. Thus material for the separating treatment is continuously passed through the apparatus until sooner or later substantially all of the fine particles are collected in the dust collector, and the mass of coarser particles substantially free from the fine powder or dust which is to be recovered is eventually trapped in the bottom of chamber K. The swinging deflector N is held at an angle by the air current entering behind it through opening O while the door M is closed and the machine is being started, and thereafter by the air current entering through the door M when the latter is opened.

I claim:—

1. In a separator of the character described, in combination, a centrifugal separator chamber, a dust collector, a dust pipe connecting the upper middle part of said centrifugal separator chamber with said dust collector adapted to carry off the finer particles separated from the mass in said separator chamber, a gravity separator chamber, a connection between the bottom of said centrifugal separator chamber and said gravity separator chamber adapted to carry the particles not carried off by said dust pipe from the centrifugal separator chamber into the gravity separator chamber, and a blower connected on its suction side with the gravity separator chamber and on its blast side with the centrifugal separator chamber, whereby a continuous circuit of air is maintained through said separator chambers, by suction in said gravity separator chamber and by blast in said centrifugal separator chamber, and whereby the blast of air in said centrifugal separator chamber is divided, part passing through said dust pipe and carrying the separated dust to the dust collector, and part passing into said gravity separator chamber and carrying the rest of the material in conjunction with gravity from the centrifugal separator chamber into the gravity separator chamber.

2. In a separator of the character described, in combination, a centrifugal separator chamber, a dust collector, a dust pipe connecting the upper middle part of said centrifugal separator chamber with said dust collector adapted to carry off the finer particles separated from the mass in said separator chamber, a gravity separator chamber, a connection between the bottom of said centrifugal separator chamber and said gravity separator chamber adapted to carry off the particles not carried off by said dust pipe from the centrifugal separator chamber into the gravity separator chamber, and a blower connected on its suction side with the gravity separator chamber and on its blast side with the centrifugal chamber by a blast pipe, the cross sectional area of the blast pipe being greater than the cross sectional area of the connection between the centrifugal and gravity separator chambers, whereby a continuous circuit of air is maintained through said separator chambers, by suction in said gravity separator chamber and by blast in said centrifugal separator chamber, and whereby the blast of air in said centrifugal separator chamber is divided, part passing through said dust pipe and carrying the separated dust to the dust collector, and part passing through said relatively smaller connection into said gravity separator chamber and carrying the rest of the material in conjunction with gravity from the centrifugal separator chamber into the gravity separator chamber.

3. In a separator of the character described, in combination, a centrifugal separator chamber, a dust pipe leading from the upper middle part of said chamber, a dust collector comprising a casing into which said dust pipe leads, said casing having one or more openings, and dust receptacles of porous material connected with said openings, a dust chamber inclosing said receptacles, a gravity separator chamber, a duct connecting the bottom of said centrifugal separator chamber, with said gravity separator, a blower connected on its suction side with the gravity separator chamber and on its blast side with the centrifugal separator chamber, and a return pipe connecting said dust chamber surrounding said dust receptacles with said gravity separator chamber.

Signed by me at Boston, Massachusetts, this tenth day of August, 1908.

JONATHAN M. SEAVER.

Witnesses:
CHARLES D. WOODBERRY,
ROBERT CUSHMAN.